United States Patent [19]

Vadseth

[11] Patent Number: 4,860,182
[45] Date of Patent: Aug. 22, 1989

[54] AIRPORT LIGHTING

[75] Inventor: Jan E. Vadseth, Sevelen, Switzerland

[73] Assignee: Meta-Fer Holding S.A., Luxembourg-Kirchberg, Luxembourg

[21] Appl. No.: 168,905

[22] Filed: Mar. 16, 1988

[30] Foreign Application Priority Data

Mar. 16, 1987 [CH] Switzerland ............... 00974/87

[51] Int. Cl.[4] .............................................. F21S 1/14
[52] U.S. Cl. .................................. 362/364; 362/339
[58] Field of Search ............... 362/267, 364, 339, 308, 362/309, 457, 244, 147

[56] References Cited

U.S. PATENT DOCUMENTS 3,999,054 12/1976 Dorman .
4,382,274 5/1983 De Backer et al. ............. 362/153
4,396,972 8/1983 Kaneko et al. .................. 362/145

FOREIGN PATENT DOCUMENTS 688938 6/1964 Canada ........................... 362/267
214731 8/1967 Denmark ........................ 362/364
0022106 8/1983 European Pat. Off. .
1183455 12/1964 Fed. Rep. of Germany .
553686 7/1974 Switzerland .
759848 10/1956 United Kingdom ............ 362/364

Primary Examiner—Ira S. Lazarus
Assistant Examiner—Sue Hagarman
Attorney, Agent, or Firm—Cushman, Darby & Cushman

[57] ABSTRACT

The invention relates to a lighting unit for installation in a plane, in particular for airports, with the object of radiating light in an optimum manner in two opposite directions in an energy-saving way and with a minimum of electric power. It should be compact and its function should not be adversely affected during rough operations by snow-clearing equipment or the like; it has the following features; Flat prism grating (1,2) are inserted horizontally in orifices of a flat prism holder (5) having an upward sloping upper surface; a light source (3) is arranged under each prism grating.

13 Claims, 4 Drawing Sheets

AIRPORT LIGHTING

The invention relates to a lighting unit for installation at one level. Particularly in airports, lights which indicate the correct way for an incoming aircraft or for aircraft taxiing on a runway, or make middle lines or limits visible, have long been installed. Since the runways are generally used in two directions, such lights must also radiate light in two directions.

Many different designs have been developed for this purpose and are familiar to the skilled worker. For example, reference may be made to U.S. Pat. Nos. 4,382,274 and 4,396,972.

However, the design according to the teaching of U.S. Pat. No. 4,396,972 has the disadvantage that, because of the lens system mounted, it projects substantially out of the level of the runway, so that there may be unpleasant consequences for an aircraft if it unintentionally rolls over at high speeds (skidding, punctured tire, etc.).

U.S. Pat. No. 4,382,274 describes just such a system having lamps which radiate in both directions and, together with a housing and prisms mounted therein, are completely located in the surface of a runway and have relatively long light emission channels which are cut into the runway surface. This design is therefore disadvantageous since it is very easy for dirt, ice, etc. to be firmly deposited in the channels, with the result that the emergence of light is hindered. Moreover, these light emergence channels entail relatively expensive installation work for the lights.

Another type of lights is described in German Pat. No. 1,183,455 and European Pat. No. 0,022,106. These have flat prisms which can be integrated into the level of the runway so that orifices cannot be blocked nor can there be an interference with aircraft landing operations.

The teaching of German Pat. No. 1,183,455 provides integral prisms which have the disadvantage that light can be radiated only with relatively great scatter.

The prisms in European Pat. No. 0,022,106 are divided into a plurality of prisms to form a prism grating which permits exact, scatter-free light emission. However, the European Auslegeschrift provides no teaching regarding the radiation of light in two directions, while German Pat. No. 1,183,455 envisages two possibilities for radiating light in two directions. In one case, two lamps are provided, each of which throws light via a lens onto a single prism, with the result that the light is refracted both in one direction and in the other. With this type of lighting, it is not possible to provide two-sided lighting which meets current specifications, since the scatter around the single prism is very great. Moreover, maximum light intensity may be produced roughly in the middle above the prism as a result of intersecting light beams from one lamp or the other and may in certain circumstances, in particular in fog or dust-laden air, confuse a pilot steering laterally.

The second variant of the German Patent provides two prisms which are supplied with light by only one light source and radiate light along a line in two opposite directions. Because the light radiation of the lamp cannot be completely utilized, this variant is energetically unfavorable, the light source having to produce more than twice as much light (relative to the light from a light source of the above variant), with the result that the power consumption is substantially higher compared with the first variant. An excessive proportion of this light is converted into heat, with the result that the lighting unit is exposed to an even higher thermal load between operation and non-operation. Moreover, this variant too provides optical lenses, which entail additional component costs and energetically unfavorable light absorption behavior. Both designs (according to the German Patent and according to the European Auslegeschrift) have the disadvantage that they offer no protection against contact with snowplows or the like. The surface of the prisms or the prism grating is therefore frequently destroyed in the winter season, with the result that light scattering is increased and the ability of the lights to function declines.

This problem is reduced, in another type of light for all-round illumination according to U.S. Pat. No. 3,999,054, by projections mounted so that they radiate around a lens unit. However, the lighting unit according to this U.S. Patent does not permit exact radiation of light in two exactly defined opposite directions.

It is therefore the object of the invention to provide a lighting unit which allows light to be optimally radiated in two opposite directions, manages with a minimum of electric power in an energy-saving manner, can be of compact construction and should not be impaired in its function as a result of rough operations by snow-clearing equipment or the like.

Furthermore, the lighting units should be capable of being integrated in the surface of a runway or the like in such a way that they can be driven over without adverse effects, for example by aircraft landing at high speeds.

All objects are achieved in a completely satisfactory manner for the first time by the features of claim 1. The prism gratings allow radiation of an exactly defined light beam with minimum scatter. The separate arrangement of an individual light source for each prism grating and for each radiation direction ensures optimum energy efficiency. By using a commercial parabolic mirror, additional lens systems can be dispensed with. The lateral offset of the prism gratings and light sources permits a compact embodiment of the entire lighting unit and prevents undesired maximum light intensities above the lighting unit in fog or dust-laden air. The ascending form of the surface of the prism holder prevents a snowplow or the like from scraping the prism gratings. However, the installation height is scarcely noticeably greater.

Further advantageous embodiments of the invention are described in the features of the subclaims.

An embodiment according to claim 2 for the most part prevents the surface of the prism gratings from being abraded by dust or sand particles, which are swept over the runway by exhaust gases from jet engines.

Sticking in the prism gratings by means of a one-component adhesive, and using the further features of claim 3, leads to outstanding stability of the prism holder and to unsurpassed tightness, the individual disks of the prism gratings advantageously, from the chemical point of view, being bonded with the same adhesive in accordance with the defining clause of claim 4. The adhesive according to claim 5 has been found to be particularly advantageous.

The adhesive may be white or colored, white absorbing the least light energy but black being ideal for preventing radiation of light through the adhesive layer. Coloring with other colors can affect the color of the radiated light to the desired extent (for example red, green, blue, etc.). To improve the heat conductivity, metallic components, for example aluminum powder, may furthermore be mixed with the adhesive, the size of the powder particles preferably being substantially smaller than the molecular size of the adhesive or of the epoxy resin. Furthermore, thin metal foils for improving the light emergence effect as well as for improving the thermal conduction, may be provided between the individual disks of the prism grating. Gold, silver and aluminum and anticorrosive alloys thereof are particularly suitable for this purpose. The aluminum foils are preferably 1/10 mm thick, hard and smooth. The metal foils can also have various thicknesses. In addition, they may project laterally from the prism grating and may be bent over to make direct contact with the metal of the prism holder. The foils thus ideally conduct heat away from the prism. They can also compensate tensile stresses.

Although the additional, for example relatively wide, protective cover according to claim 6 is itself relatively easily destroyed, it is cheap to produce and easy to replace. It can be applied either in the form of a foil or in the form of a protective coating. In both cases, it is removed by known measures.

The measures of claims 7, 8 and 9 effectively prevent or minimize mechanical destruction of the projections of the prism holder.

The features of claim 10 describe an advantageous design for an airfield light which can be mounted very rapidly and removed again from its mounting very rapidly but nevertheless is held securely and stably and permits resilience in the axial direction.

The feature of claim 11 prevents a lighting unit according to the invention from being unintentionally rotated out of its position.

The lighting units according to the invention can, according to claim 12, also be provided as signal units on roads outside airfields, permitting increased traffic safety without impeding the traffic. Compared with the conventional back-reflecting elements ("cats' eyes"), the light is more reliable in operation and could be driven over directly in winter during snow clearance without suffering damage.

The invention will be illustrated below by means of Examples and by reference to the drawings.

Figure 1:
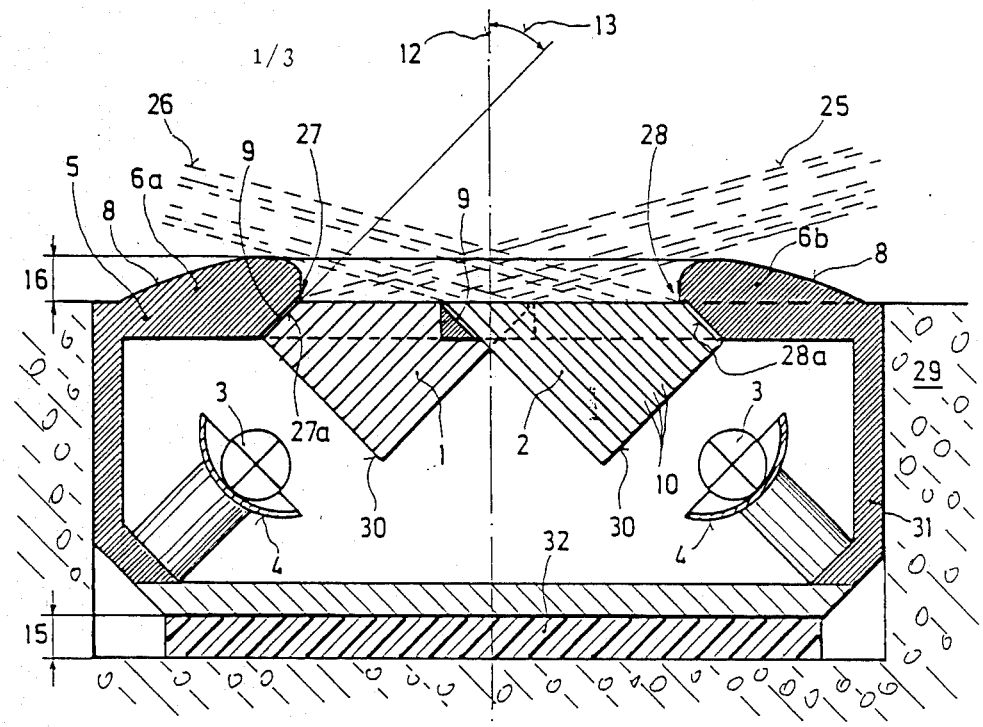
FIG. 1 shows a vertical section through a lighting unit having two flat prism gratings directed toward one another.

The schematic representation of a lighting unit with light emergence at a shallow angle in FIG. 1 shows a pot-shaped prism holder 5 which can be dismantled in a manner not shown. The prism holder 5 possesses, in its upper surface, two orifices 27 and 28, which hold two prism gratings 1 and 2 on their holding surfaces 27a and 28a.

For permanent and air-tight bonding, an epoxy-based one-component adhesive 9 is applied between the prism gratings 1 and 2 and the holding surfaces 27a and 28a. The adhesive 9 has good resilience, excellent adhesion and good aging resistance.

The holding surfaces 27a and 28a form an angle 13 of 45 degrees to the vertical 12. This angle 13 is directly dependent on the refraction properties of the glass of the prism gratings, on the angle of incidence of the light and on the desired light emergence angle at the surface of the prism gratings.

The prism gratings consist of borosilicate glass disks 10 adhesively bonded to one another.

Figure 2:
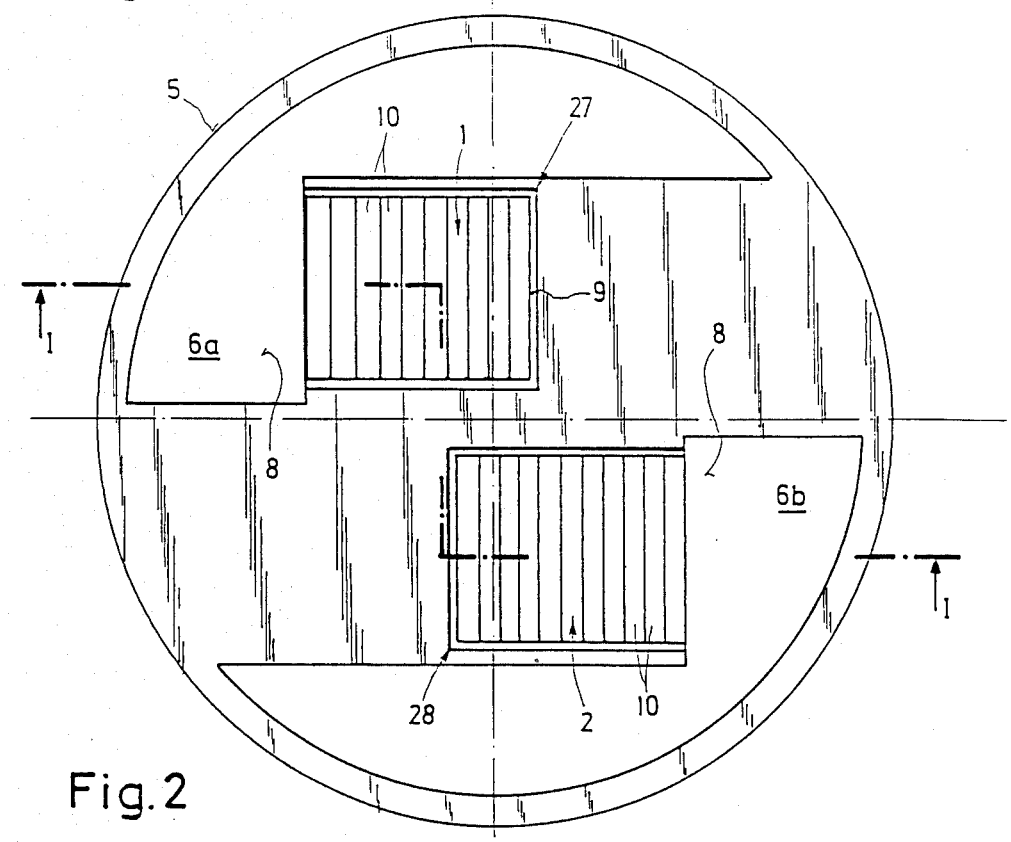
FIG. 2 shows the corresponding plan view.
Figure 2A:
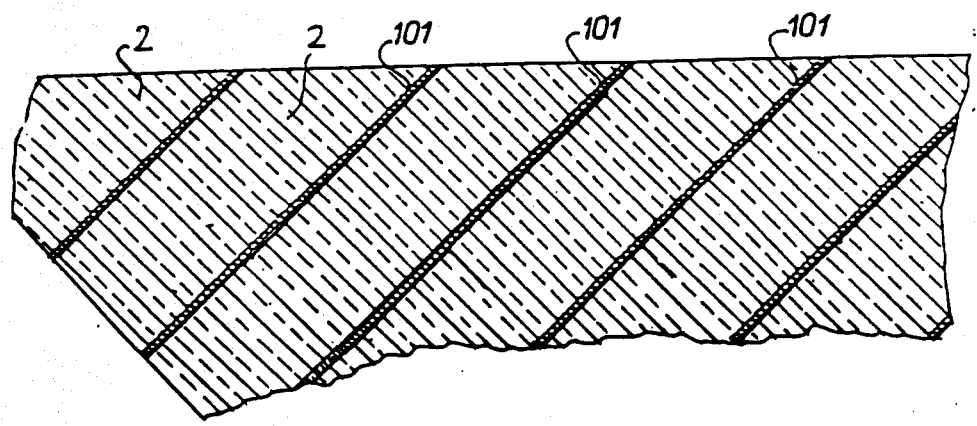
FIG. 2a is an enlarged sectional view of prism gratings provided in accordance with the present invention with thin metal foil arranged between the disks defining the prism gratings.

Metal foils 101 may be bonded in between as shown in FIG. 2a.

To protect the upper side of the prism gratings 1 and 2, the surface of the upper side of the prism holder 5 is wedge-shaped and ascends in the direction of the prism gratings 1 and 2, on the sides facing away from the light beams 25 and 26. These wedge-shaped projections 6a and 6b also continue at the sides of the prism gratings 1 and 2, as can be seen more clearly in FIG. 2. The height 16 of the projections 6a and 6b is not more than 1-5 mm. The surface 8 of the wedge-shaped projections 6a and 6b is streamlined, with the result that abrasion due to flying sand or the like at high wind velocities at the upper side of the prism grating 1s and 2 is virtually completely prevented.

Two light sources 3, each having a reflector 4, are provided in the prism holder 5, approximately below the prism gratings 1 and 2. They emit their light beams approximately at right angles to the incident surfaces 30 of the prism gratings 1 and 2.

The prism holder 5 is inserted into a recess 31 in the runway 27 in such a way that only the projections 6a and 6b project beyond the surface of the runway 29. A resilient layer 32 of integral foam is provided between the lower surface of the prism holder 5 and the substructure of the runway 29. If force is exerted on the prism holder 5 or on its upper surface, in particular on the projections 6a and 6b, the resilience of the layer 32 permits the prism holder 5 to compensate by moving slightly downward. Measures which are not shown are employed to prevent the prism holder 5 from projecting out of the recess 31 by a distance greater than the height 16, which is defined by the maximum height of the projections 6a and 6b. The layer 32 has a thickness 15 which corresponds to the height 16. The integral nature of the layer prevents penetration of water into the pores of the foam, so that the layer is capable of performing its function at all times.

The power supply for the light sources 3 is not shown, but may be via a power cable which is inserted in a water-tight manner and advantageously enters a cavity with a dome shape underneath the prism holder.

To obtain a specifically directed light emergence angle, the prism grating can be provided with a concave or convex ground surface on its side facing toward the light source 3 or on its incident surface 30, so that the light beams from the parabolic reflector, which are in principle parallel, are radiated or deflected in the desired direction. The ground surface may furthermore be divided into a plurality of ground surfaces having different radii. If a color filter is also provided between the light source 3 and the incident surface 30, the thermal properties are improved, the space occupied by the ground surface serving as a heat insulation barrier. If the reflector 4 is in the form of a cold light reflector, i.e. also transmits heat radiation, the heat to which the prism grating is exposed is reduced several times over. If necessary, an appropriate upstream heat radiation filter can also be provided.

FIG. 2 shows that the projections 6a and 6b are approximately L-shaped and intersect over the geometric center of the upper side of the prism holder 5, so that a long hard object, for example the lower edge of a snow-clearing machine, can push with full force over the airfield light without coming into contact with the glass of the prism gratings 1 and 2. The surfaces in front of the prism gratings 1 and 2, in the direction of their light beams 25 and 26, are flat in order to permit even small radiant angles of the light beams 25 and 26.

Figure 3:
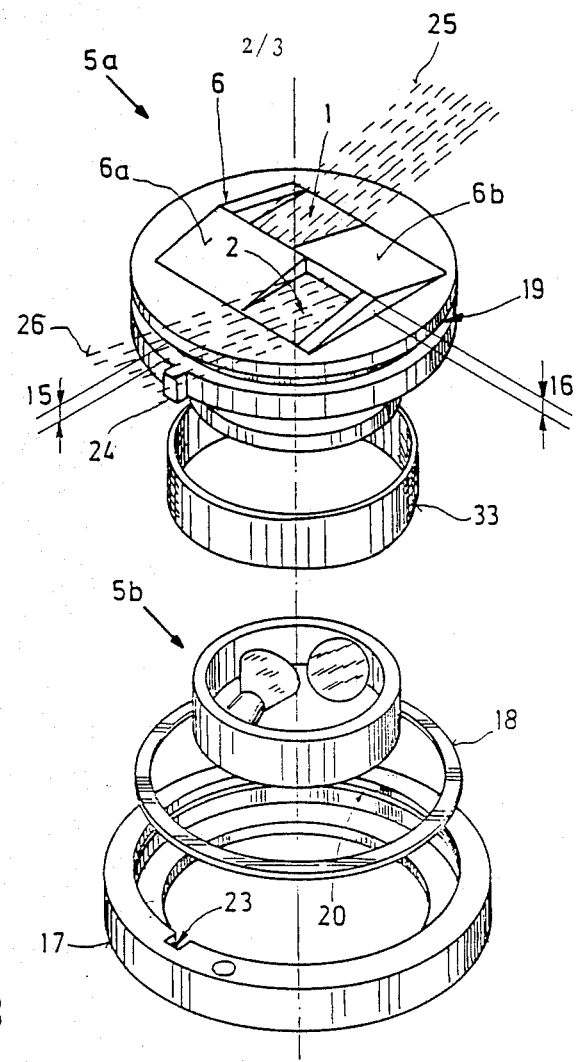
FIG. 3 shows a perspective view of a slightly different lighting unit in a state prior to assembly.
Figure 5:
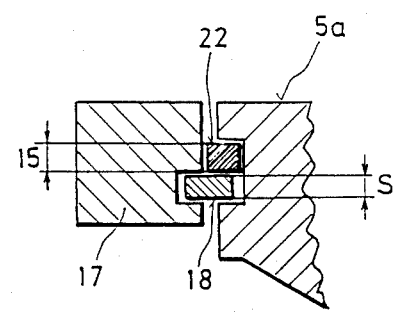
FIG. 5 shows a detail of a retainer of the lighting unit according to FIG. 3 and FIGS. 6 and 7 show possible uses of the invention for road marking.

FIG. 3 shows a slightly different variant of an airfield light, in which the prism gratings 1 and 2 are staggered in such a way that their edges which face away from the respective light beam 25 or 26 lie on a line. The projections 6a and 6b are integrated to form an overall projection 6 having a maximum height 16 of 1–5 mm. This arrangement allows the lighting unit to be kept very small. The prism holder 5a can be connected to a lower part 5b by means of a shrink sleeve 33. The prism holder 5a has, at its circumference, a groove 19 whose height comprises the thickness S of a spring ring 18 plus the height 15. The spring ring 18 retains the prism holder 5a in the axial direction in a retaining ring 17 or in its groove 20. As can be more clearly seen in FIG. 5, the height 15 corresponds to the height of a resilient ring 22 which is arranged above the spring ring 18 in the groove 19.

When the prism holder 5a is pressed down, the ring 22 is compressed, by a maximum extent 15, which corresponds to the height 16 of the projections 6a and 6b. This means that the lighting unit according to the invention is deflected slightly downward when driven over, with the result that any damage to its upper surface can be minimized.

For non-rotatable guidance of the prism holder 5a in the retaining ring 17, the latter therefore has a groove 23 in which a spring 24 engages the prism holder 5a.

Figure 4:
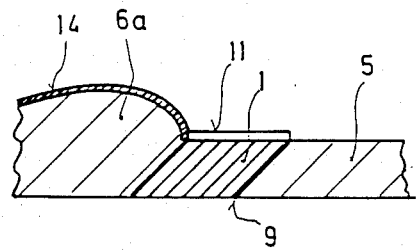
FIG. 4 shows a detail of the upper side of the lighting unit according to FIGS. 1 and 2.

FIG. 4 shows a detail of the invention: the prism grating 1 is covered by a detachable protective cover 11 consisting of a transparent, relatively soft plastic. The projection 6a of the prism holder 5 is provided with an Eloxal protective layer 14 which is substantially harder than the prism holder 5 produced from cast aluminum, so that damage to the projections can be reduced.

The protective cover 11 provides a barrier against troublesome scratching processes, in particular in the case of flying sand or the like. In the event of damage to the protective cover 11, which, for example, may be bonded on, the said cover is simply removed and replaced with a new one.

Figure 6:
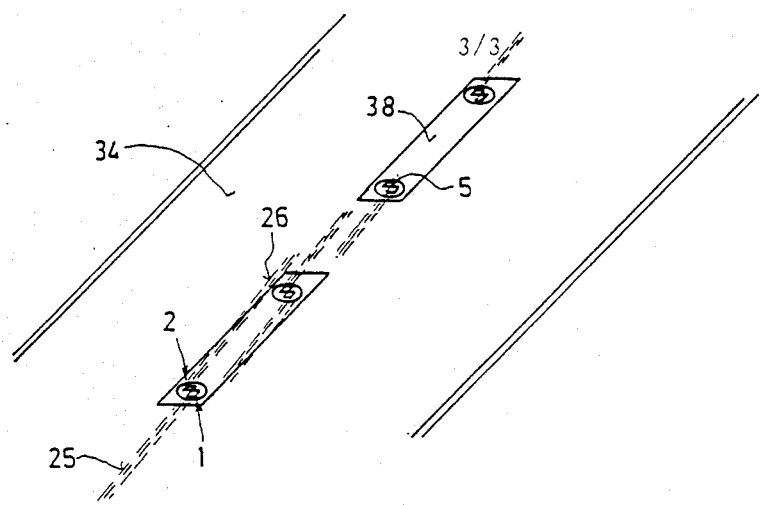

FIG. 6 shows a stylized road section with a broken guide line 38 in the middle. Prism holders 5 according to the invention are inserted in the guide line 38, the prism gratings 1 and 2 being oriented with their radiating direction in the longitudinal direction of the roadway 34. The yellow light beams 25 and 26 from prism gratings 1 and 2 permit a driver better orientation on the road, particularly during poor visibility conditions, such as fog, etc.

Figure 7:
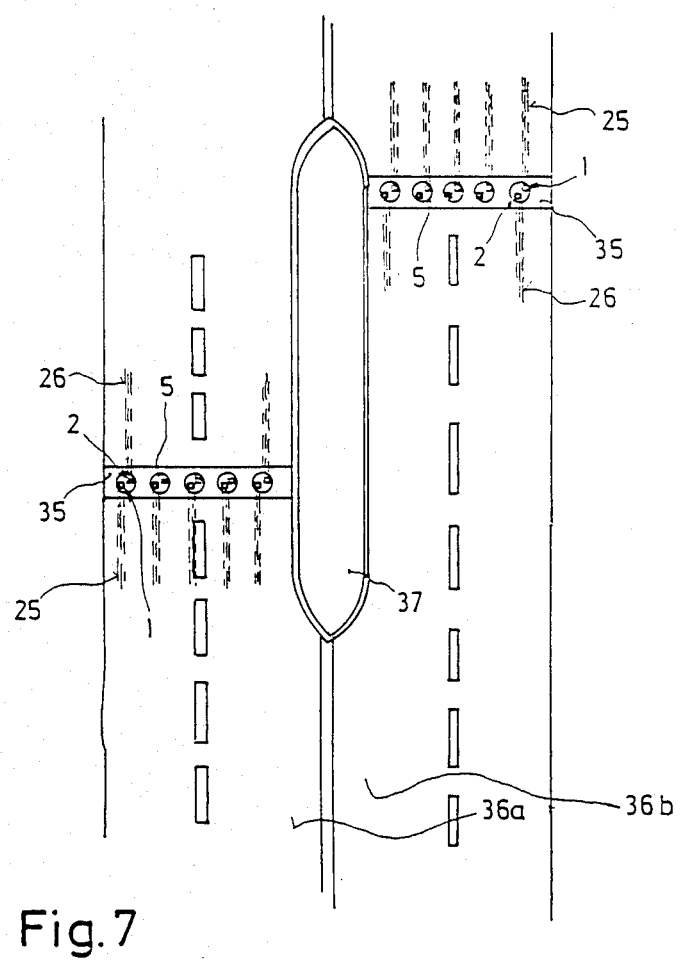

FIG. 7 shows a safety marking 35 on a divided roadway 36a and 36b. The safety mark 35 is a flat bar which is integrated in the surface of the roadway 36a or 36b and provided with integral prism holders 5. The prism holders 5 have prism gratings 1 and 2 whose radiating direction is oriented in the longitudinal direction of the roadway 36a or 36b. The roadways 36a and 36b are separated by a barrier 37. To avoid "driving in the wrong direction", the light beams 25 from prism gratings 1 are colored red so that a driver would be made aware that he is on the wrong roadway 36a or 36b in the opposite direction. In the other direction, light beams 26 from the prism gratings 2 could be colored green or could remain switched off.

In the same way, it would also be possible, for example, to provide a combination of traffic light control with such bars 35, the beams 25 being emitted as red beams when a traffic light shows red.

The arrangement of the prism holders in the roadway does not in any way interfere with the motor traffic and are not even detected by rubber-tired vehicles rolling over.

The Figures shown do not restrict the invention. For example, the prism gratings 1 and 2 may also be provided on their upper surface with a gentle slope of about 1 degree to simplify light emergence and to increase self-cleaning of the upper surface of the prism gratings 1 and 2, for example by rain. The use of a light according to the invention is in no way restricted to airfields and roads; for example, it may be used underwater, as underfloor lighting in exhibition halls, as flush-mounted lighting units in ceilings, etc.

What is claimed:

1. A watertight lighting unit for installation in the road surfacing of an airfield or a road, which comprises, in combination:
   a. two flat prism gratings with their upper side lying substantially in the plane of the surface of said road surfacing, inserted into orifices of a prism holder which has a substantially flat upper side with respect to said plane;
   b. a light source having a reflector arranged under each prism grating, substantially all light being produced being emitted unimpeded through the corresponding prism grating;
   c. the light sources, the associated prism gratings, and the respective light beam being arranged in the opposite direction to one another and laterally displaced with respect to one another; and
   d. the surface of the upper side of the prism holder, at least in the direction toward the prism grating or in the direction of the light beam being wedge-shaped and sloping upwardly at the side of each prism grating facing away from the light beam and/or at least one side being parallel to said light beam of the said prism holder.

2. A lighting unit as claimed in claim 1, wherein the wedge-shaped projections have a streamlined surface.

3. A lighting unit as claimed in claim 1, wherein each prism grating is fastened in the prism holder by means of a first adhesive, at the holding surface surrounding the associated orifice, at least one surface in the prism holder making an angle of about 45 degrees to the vertical for holding each prism grating, and wherein the prism gratings are composed of borosilicate glass disks which are adhesively bonded to one another by means of a second adhesive similar to said first adhesive.

4. A lighting unit as claimed in claim 1, wherein thin metal foils are arranged between said glass disks.

5. A lighting unit as claimed in claim 3 or 4, wherein the adhesive has the following specifications: heat-curable epoxy-based one-component adhesive; impact shear strength: 30–40 Nmm/mm$^2$; tensile shear strength: 30–60 N/mm$^2$; peel strength (by Boing method): 10–13 N/mm.

6. A lighting unit as claimed in claim 1, wherein the prism gratings have a detachable protective cover consisting of a transparent plastic.

7. Lighting as claimed in claim 1, wherein the surface of the wedge-shaped projections is provided with an impactresistant and/or abrasion-resistant protective layer, for example a coating.

8. Lighting as claimed in claim 7, wherein the prism holder consists of cast aluminum and the protective layer is formed from Eloxal.

9. A lighting unit as claimed in any of the preceding claims, wherein the prism holder is spring-mounted in the vertical direction, the spring displacement corresponding to not more than the maximum height of the wedge-shaped projections.

10. A lighting unit as claimed in claim 9, wherein the prism holder is kept locked in a retaining ring, the locking element provided being a spring ring which can be arranged in diametrically opposed grooves in the prism holder or in the retaining ring, preferably at least one of the grooves being wider than the spring ring at least by the amount of the maximum height of the wedge-shaped projection, and a resilient ring preferably of elastomeric material, is arranged in this widened part.

11. A lighting unit as claimed in claim 1, for an airfield, wherein the prism holder is held non-rotatably in the retaining ring by means of an axial groove and spring.

12. Use of a lighting unit as claimed in claim 1 as an integral component in ground markings on roads for public traffic.

13. A lighting unit as claimed in claim 1, wherein the material of said prism grating has a refractive index of about 1.47.

* * * * *